(12) United States Patent
Uang et al.

(10) Patent No.: US 8,786,224 B2
(45) Date of Patent: Jul. 22, 2014

(54) SENSORLESS COMMUTATION CIRCUIT AND SENSORLESS DRIVING APPARATUS FOR BRUSHLESS MOTOR

(75) Inventors: Chii-Maw Uang, Kaohsiung (TW); Zu-Sheng Ho, Kaohsiung (TW); Ge-Wei Lee, Kaohsiung (TW)

(73) Assignee: I-Shou University, Kaohsiung (TW)

( * ) Notice: Subject to any disclaimer, the term of this patent is extended or adjusted under 35 U.S.C. 154(b) by 79 days.

(21) Appl. No.: 13/586,838

(22) Filed: Aug. 15, 2012

(65) Prior Publication Data

US 2013/0207580 A1 Aug. 15, 2013

(30) Foreign Application Priority Data

Feb. 10, 2012 (TW) .............................. 101104403 A

(51) Int. Cl.
*H02P 6/06* (2006.01)

(52) U.S. Cl.
USPC ............. 318/400.06; 318/400.32; 318/254.1; 318/400.2; 318/718

(58) Field of Classification Search
USPC ............. 318/400.06, 400.32, 254.1, 400.01, 318/400.2, 718, 805, 808
See application file for complete search history.

(56) References Cited

U.S. PATENT DOCUMENTS

| 5,694,010 A * | 12/1997 | Oomura et al. .......... 318/400.07 |
| 7,492,113 B2 * | 2/2009 | Maeda ..................... 318/400.01 |
| 2011/0204834 A1 | 8/2011 | Imai et al. |

FOREIGN PATENT DOCUMENTS

| TW | 591882 | 6/2004 |
| TW | 200913458 | 3/2009 |

* cited by examiner

*Primary Examiner* — Bentsu Ro
*Assistant Examiner* — Iftekhar Mustafa
(74) *Attorney, Agent, or Firm* — Jianq Chyun IP Office

(57) ABSTRACT

A sensorless commutation circuit and sensorless driving apparatus for a brushless motor includes a voltage divided unit, a control signal output unit, a switch unit and a comparison unit. The voltage divided unit outputs a voltage divided signal according to a phase voltage signal of the brushless motor. The control signal output unit outputs a filter control signal, wherein the filter control signal has a same switching cycle as a pulse width modulation control signal that drives the brushless motor. The switch unit is coupled to the control signal output unit and the voltage divided unit, and outputs a comparison signal according to the filter control signal and the voltage divided signal. The comparison unit is coupled to the switch unit, and outputs a correct commutation signal according to the comparison signal.

10 Claims, 4 Drawing Sheets

SENSORLESS COMMUTATION CIRCUIT AND SENSORLESS DRIVING APPARATUS FOR BRUSHLESS MOTOR

CROSS-REFERENCE TO RELATED APPLICATION

This application claims the priority benefit of Taiwan application serial no. 101104403, filed on Feb. 10, 2012. The entirety of the above-mentioned patent application is hereby incorporated by reference herein and made a part of this specification.

BACKGROUND OF THE INVENTION

1. Field of the Invention

The invention relates to a commutation circuit and a motor driving apparatus, and more particularly, to a sensorless commutation circuit and a sensorless motor driving apparatus for brushless motor.

2. Description of Related Art

Current brushless direct current (DC) motors use sensor to detect the rotating positions of motors. For example, after positions sensors such as hall elements, light encoders, or resolvers have been additionally installed, drivers can then send out suitable commutation signals causing the motors to rotate normally. The advantages and disadvantages of commutation control will directly affect the performance of the motion control such as the position or speed of the rotor. If the resolutions of these sensors are raised in order to increase the precision of commutation control, the production cost will also increase. These sensors also increase the required volume of an apparatus, which further increases production cost.

As products are becoming thinner and lighter, motors are also becoming smaller, with higher precision, and less noisy. Since motors are becoming smaller, the amount of space taken up by position sensors has been a main hindrance when desiring to make products thinner. In addition, factors such as the life-span of a position sensor, temperature, and interference sensitivity, decrease the reliability of sensor components, which in turn affects the reliability of commutation control. As such, the conditions and environment of where a motor is applied is further limited.

Thus, sensorless driving apparatuses can decrease the time and effort motor vendors spend on for finding the precise position of rotor. Based on the aforementioned restrictions of sensor components, sensorless driving apparatuses that do not require position sensors have become more attractive, and have great potential in the development of driving technology.

In general sensorless driving apparatuses, a commutation circuit is used to replace the hall elements, to detect the location of the rotor and transmit the commutation signals to the controller, so as to drive and control the brushless motor. The brushless motor requires a pulse width modulation (PWM) signal when driving to modulate and control the rotational speed of the motor. However, when the brushless motor is at the initial startup of an open loop, since the brushless motor is operating under a low speed condition, the commutation signal outputted to the commutation circuit by the PWM signal is viewed as a significant interference signal. This causes the controller to be unable to determine if the signals received are correct switch signals. Therefore, the brushless motor requires a longer time for ticking over. Only when the rotation speed of the brushless motor is increased, and the effect of the PWM signal towards the commutation signal is decreased, does the brushless motor enter a closed loop control condition, and operate under a stable condition.

SUMMARY OF THE INVENTION

The invention provides a sensorless commutation circuit for a brushless motor. The sensorless commutation circuit uses a filter control signal, a switch unit, and a comparison unit to output a commutation signal according to a phase voltage signal of the brushless motor.

The invention provides a sensorless driving apparatus of a brushless motor. The sensorless driving apparatus causes a micro controller to output a pulse width modulation control signal according to a low noise commutation signal outputted by the sensorless commutation circuit.

The invention provides a sensorless commutation circuit for a brushless motor. The sensorless commutation circuit includes a voltage divided unit, a control signal output unit, a switch unit, and a comparison unit. The voltage divided unit outputs a voltage divided signal according to a phase voltage signal of the brushless motor. The control signal output unit outputs a filter control signal. The filter control signal has the same switching cycle as a pulse width modulation control signal that drives the brushless motor. The switch unit is coupled to the control signal output unit and the voltage divided unit. The switch unit outputs a comparison signal according to the filter control signal and the voltage divided signal. The comparison unit is coupled to the switch unit, and outputs a correct commutation signal according to the comparison signal.

In an embodiment of the invention, the brushless motor further includes a first coil, a second coil, and a third coil, respectively outputting a first phase voltage signal, a second phase voltage signal, and a third phase voltage signal.

In an embodiment of the invention, the voltage divided unit further includes a first voltage divider, a second voltage divider, and a third voltage divider, each with an input terminal and an output terminal. The input terminals of the first voltage divider, the second voltage divider, and the third voltage divider are respectively coupled to the first coil, the second coil, and the third coil. The output terminals of the first voltage divider, the second voltage divider, and the third voltage divider respectively output a first voltage divided signal, a second voltage divided signal, and a third voltage divided signal.

In an embodiment of the invention, the switch unit further includes a first switch, a second switch and a third switch each having a first terminal, a second terminal, and a third terminal. The first terminals of the first switch, the second switch, and the third switch, are respectively coupled to the input terminals of the first voltage divider, the second voltage divider, and the third voltage divider. The second terminals of the first switch, the second switch, and the third switch, respectively output a first comparison signal, a second comparison signal, and a third comparison signal. The third terminals of the first switch, the second switch, and the third switch, are all coupled to the control signal output unit.

In an embodiment of the invention, the second terminals of the first switch, the second switch, and the third switch are respectively coupled to a first capacitor, a second capacitor, and a third capacitor.

In an embodiment of the invention, the comparison unit further includes a first comparator, a second comparator, and a third comparator, each having a positive input terminal, a negative input terminal, and a signal output terminal. The negative input terminals of the first comparator, the second comparator, and the third comparator are respectively coupled to the second terminals of the first switch, the second switch, and the third switch. The signal output terminals of the first comparator, the second comparator, and the third comparator respectively output a first correct commutation signal, a second correct commutation signal, and a third correct commutation signal.

In an embodiment of the invention, the switch unit further includes a fourth switch with a first terminal, a second terminal, and a third terminal. The first terminal of the fourth switch is coupled to the output terminals of the first voltage divider, the second voltage divider, and the third voltage divider. The second terminal of the fourth switch is coupled to the positive input terminals of the first comparator, the second comparator, and the third comparator, outputting a neutral signal. The third terminal of the fourth switch is coupled to the control signal output unit.

In an embodiment of the invention, the neutral signal is generated according to the first voltage divided signal, the second voltage divided signal, and the third voltage divided signal.

In an embodiment of the invention, the positive input terminals of the first comparator, the second comparator, and the third comparator are respectively coupled to the second terminals of the second switch, the third switch, and the first switch.

The invention provides a sensorless driving apparatus for a brushless motor. The sensorless driving apparatus includes a micro controller, an inverter, and a sensorless commutation circuit. The micro controller is used to output a pulse width modulation control signal according to a phase voltage signal. The inverter is coupled to the micro controller, and is used to switch a pulse width modulation control signal to a phase voltage signal of the brushless motor. The sensorless commutation circuit is coupled to the micro controller and the inverter. The sensorless commutation circuit includes a voltage divided unit, a control signal output unit, a switch unit, and a comparison unit. The voltage divided unit outputs a voltage divided signal according to a phase voltage signal of the brushless motor. The control signal output unit outputs a filter control signal, wherein the filter control signal has the same switching cycle as a pulse width modulation control signal that drives the brushless motor. The switch unit is coupled to the control signal output unit and the voltage divided unit, and outputs a comparison signal according to the filter control signal and the voltage divided signal. The comparison unit is coupled to the switch unit, and outputs a correct commutation signal according to the comparison signal.

Based on the above, the embodiments of the invention provide a sensorless commutation circuit and a sensorless driving apparatus for a brushless motor. An on/off state of a switch unit is controlled with a filter control signal that has the same switching cycle as a pulse width modulation control signal of the brushless motor. In addition, when the brushless motor is at an initial low speed condition, the sensorless driving apparatus can output a stable pulse width modulation control signal to control the brushless motor according to correct commutation signals with low noise outputted by the comparison units.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
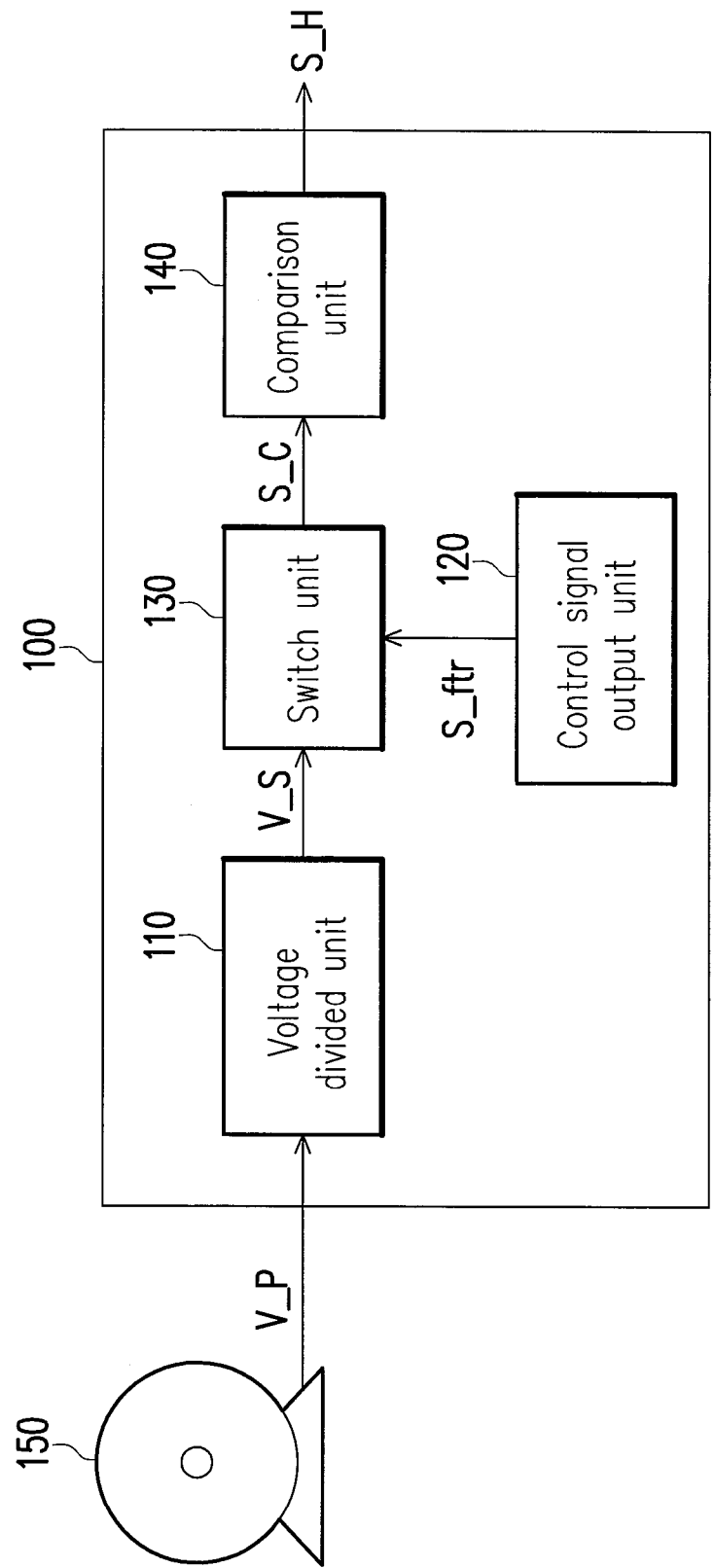
FIG. 1 is a schematic view illustrating a sensorless commutation circuit according to an embodiment of the invention.

The embodiments of the invention provide a sensorless commutation circuit and a sensorless driving apparatus for a brushless motor. The sensorless commutation circuit can output a low noise commutation signal, so that the sensorless driving apparatus can drive the brushless motor according to the low noise commutation signal. This further raises the stability of the brushless motor being controlled from an initial open loop startup to a closed loop control. In order to make the invention more comprehensible, embodiments are described below as the examples to show the invention. Moreover, elements/components/steps with same reference numerals represent same or similar parts in the drawings and embodiments.

FIG. 1 is a schematic view illustrating a sensorless commutation circuit according to an embodiment of the invention. Referring to FIG. 1, the sensorless commutation circuit 100 includes a voltage divided unit 110, a control signal output unit 120, a switch unit 130, and a comparison unit 140. The voltage divided unit 110 is coupled to the brushless motor 150, and outputs a voltage divided signal V_S according to a phase voltage signal V_P of the brushless motor 150. The control signal output unit 120 is used to output a filter control signal S_ftr. The switch unit 130 is coupled to the control signal output unit 120 and the voltage divided unit 110. The switch unit outputs a comparison signal S_C according to the filter control signal S_ftr and the voltage divided signal V_S. The comparison unit 140 is coupled to the switch unit 130, and outputs a correct commutation signal S_H according to the comparison signal S_C.

In detail, when the brushless motor 150 operates, the brushless motor 150 outputs the phase voltage signal V_P to the sensorless commutation circuit 100 at the same time. At this time, the voltage divided unit 110 receives the phase voltage signal V_P outputted by the brushless motor 150, and lowers the phase voltage signal V_P according to a specific ratio to the voltage divided signal V_S which can be operated by the comparison unit 140.

Next, the voltage divided unit 110 outputs the voltage divided signal V_S to the switch unit 130, wherein the switch unit 130 switches the on/off state according to the filter control signal S_ftr outputted by the control signal output unit 120, so as to determine the comparison signal S_C outputted by the switch unit 130. For example, when the filter control signal S_ftr is at a high level, the switch unit 130 is turned on, causing the voltage divided signal V_S to be directly outputted to the comparison unit 140. On the other hand, when the filter control signal S_ftr is at a low level, the switch unit 130 is turned off, and the voltage divided signal V_S is not directly outputted to the comparison unit 140. Thus, the switch unit 130 outputs the comparison signal S_C to the comparison unit 140 according to the filter control signal S_ftr and the voltage divided signal V_S.

Finally, the comparison unit 140 performs comparisons according to the comparison signal S_C and other reference signals, and obtains the correct commutation signals with different phases. The aforementioned reference signals, in other embodiments of multi-phase brushless motors, can be neutral signals or multiple comparison signals outputted by the switch unit 130. The invention is not limited thereto.

Figure 2:
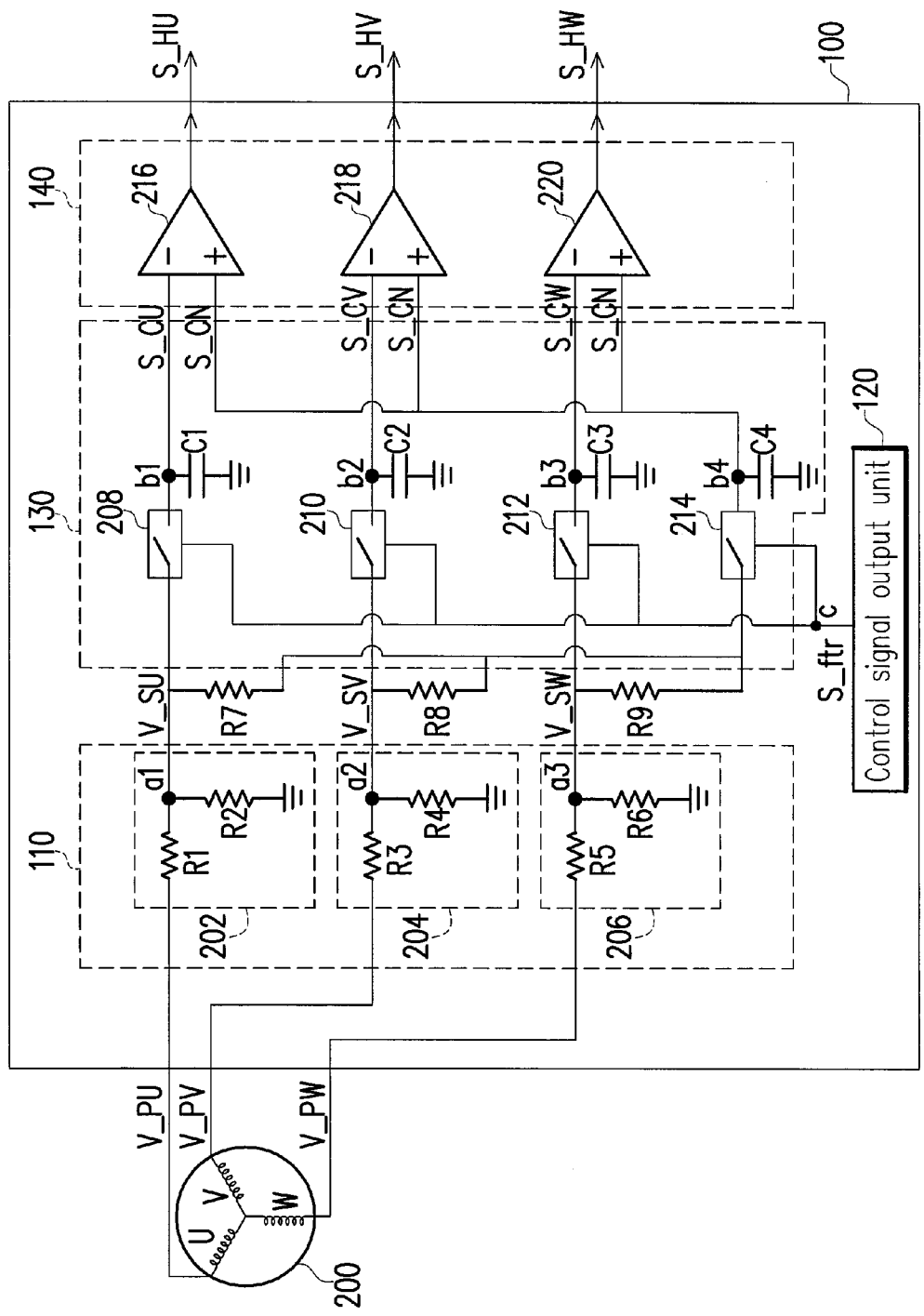
FIG. 2 is a circuit diagram of the sensorless commutation circuit of according to an embodiment of the invention.

FIG. 2 is a circuit diagram of the sensorless commutation circuit of according to an embodiment of the invention. Referring to FIG. 2, the sensorless commutation circuit 100 is used as a commutation circuit of a three phase brushless direct current motor 200. The comparison unit 140 is a neutral comparison circuit which used neutral signal as reference signals. The three phase brushless direct current motor 200 includes a first coil U, a second coil V, and a third coil W, respectively outputting a corresponding first phase voltage signal V_PU, a second phase voltage signal V_PV, and a third phase voltage signal V_PW.

In the embodiment, the voltage divided unit 110 of the sensorless commutation circuit 100 includes a first voltage divider 202, a second voltage divider 204, and a third voltage divider 206. The first voltage divider 202, the second voltage divider 204, and the third voltage divider 206 are respectively coupled to the first coil U, the second coil V, and the third coil W of the three phase brushless direct current motor 200 at each respective input terminal, so as to receive the first phase voltage signal V_PU, the second phase voltage signal V_PV, and the third phase voltage signal V_PW. Output terminals of the first voltage divider 202, the second voltage divider 204, and the third voltage divider 206 respectively output a first voltage divided signal V_SU, a second voltage divided signal V_SV, and a third voltage divided signal V_SW. The first voltage divider 202, the second voltage divider 204, and the third voltage divider 206 have circuit structures of a serially connected resistor R1 and a resistor R2, a serially connected resistor R3 and a resistor R4, and a resistor R5 and a serially connected resistor R6, respectively. A node a1, a node a2, and a node a3 respectively output the first voltage divided signal V_SU, the second voltage divided signal V_SV, and the third voltage divided signal V_SW.

The switch unit 130 includes a first switch 208, a second switch 210, a third switch 212, and a fourth switch 214, respectively corresponding to a first capacitor C1, a second capacitor C2, a third capacitor C3, and a fourth capacitor C4. A first terminal (i.e. node a1, node a2, and node a3) of the first switch 208, the second switch 210, and the third switch 212 respectively couple to the output terminal of the first voltage divider 202, the second voltage divider 204, and the third voltage divider 206, so as to respectively receive the first voltage divided signal V_SU, the second voltage divided signal V_SV, and the third voltage divided signal V_SW. In addition, a first terminal of the fourth switch 214 is coupled to the resistors R7, R8, and R9, and receives the first voltage divided signal V_SU, the second voltage divided signal V_SV, and the third voltage divided signal V_SW through the resistors R7, R8, and R9.

A third terminal (node c) of the first switch 208, the second switch 210, the third switch 212, and the fourth switch 214 is commonly coupled to the control signal output unit 120, so as to control the on/off state of each switch according to the filter control signal S_ftr. Furthermore, a second terminal (node b1, node b2, node b3, and node b4) of the first switch 208, the second switch 210, the third switch 212, and the fourth switch 214 respectively outputs a first comparison signal S_CU, a second comparison signal S_CV, a third comparison signal S_CW, and a neutral signal S_CN. In the embodiment, the neutral signal S_CN is generated according to the first voltage divided signal V_SU, the second voltage divided signal V_SV, and the third voltage divided signal V_SW. However, in other embodiments, the neutral signal S_CN can be generated according to other reference voltages. The invention is not limited thereto.

After each switch of the switch unit 130 is turned off, the back-end voltage may fluctuate. Thus, in the embodiment, the second terminals of the first switch 208, the second switch 210, the third switch 212, and the fourth switch 214 are further respectively coupled to the capacitors C1, C2, C3, and C4. The capacitors C1, C2, C3, and C4 conserve charges so as to latch and hold the voltage when the back electromotive force (BEMF) turned on.

The comparison unit 140 includes a first comparator 216, a second comparator 218, and a third comparator 220. A negative input terminal of each of the first comparator 216, the second comparator 218, and the third comparator 220 is respectively coupled to the second terminal of each of the first switch 208, the second switch 210, and the third switch 212, so as to receive the first comparison signal S_CU, the second comparison signal S_CV, and the third comparison signal S_CW. On the other hand, a positive input terminal of each of the first comparator 216, the second comparator 218, and the third comparator 220 couples to the second terminal of the fourth switch 214, so as to receive the neutral signal S_CN. Thus, an output terminal of the first comparator 216 obtains a first correct commutation signal S_HU according to the first comparison signal S_CU and the neutral signal S_CN. Similarly, an output terminal of the second comparator 218 and an output terminal of the third comparator 220 respectively obtains a second correct commutation signal S_HV according to the second comparison signal S_CV and the neutral signal S_CN, and a third correct commutation signal S_HW according to the third comparison signal S_CW and the neutral signal S_CN.

It should be noted that the first correct commutation signal S_HU, the second correct commutation signal S_HV, and the third correct commutation signal S_HW obtained in the embodiment must further go through phase delay in order to obtain the real commutation point required by the motor driving apparatus.

Figure 3:
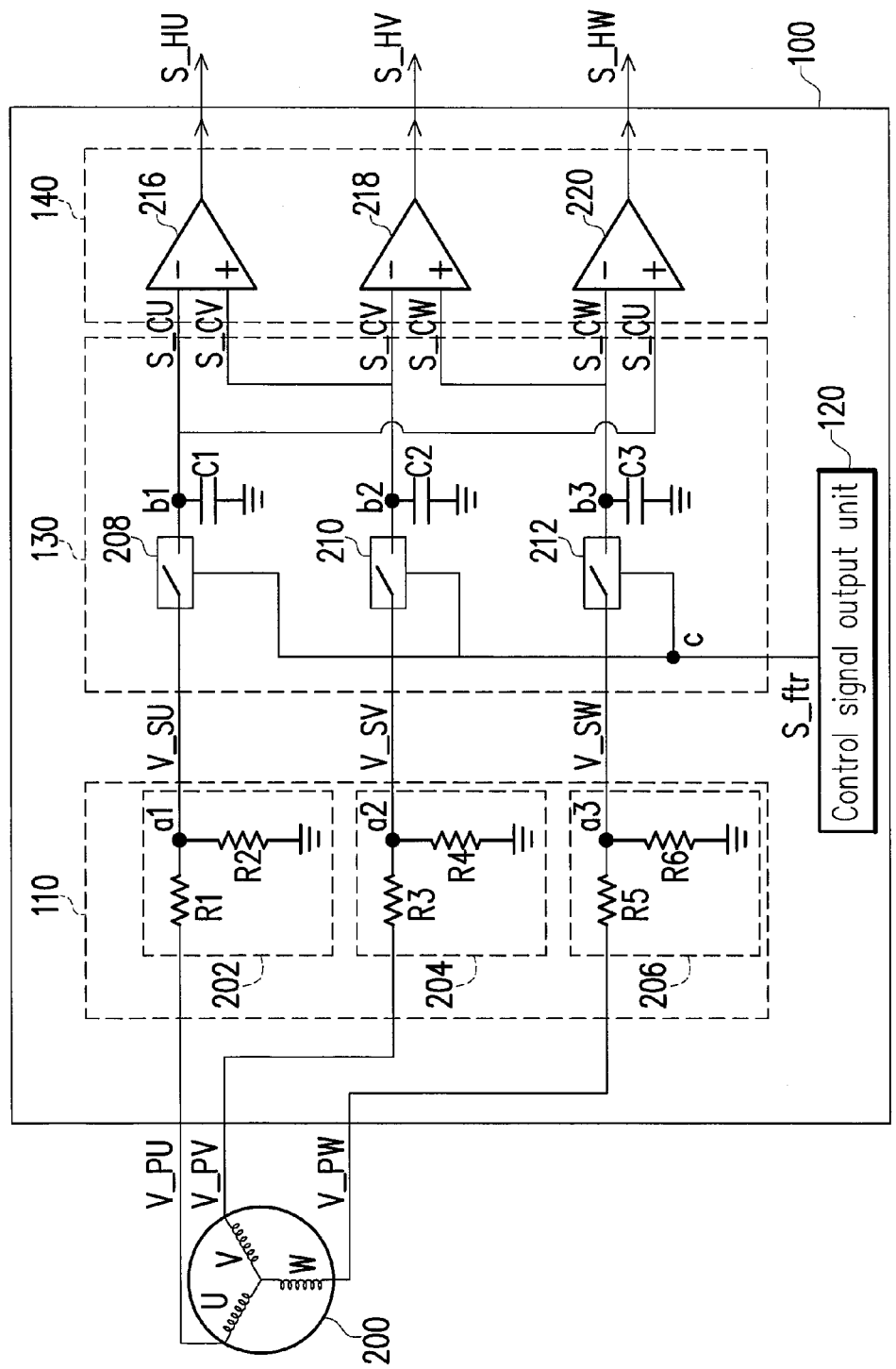
FIG. 3 is a circuit diagram of the sensorless commutation circuit of according to another embodiment of the invention.

FIG. 3 is a circuit diagram of the sensorless commutation circuit of according to another embodiment of the invention. Referring to FIG. 2 and FIG. 3, the embodiment is similar to the embodiment of FIG. 2. The difference is that in the embodiment, the comparison unit 140 is a phase voltage comparison circuit which used neighboring comparison signals as reference signals. Thus, the circuit structure of the embodiment omits the structures required for generating the neutral signal (resistors R7, R8, R9, the fourth switch 214, and the capacitor C4).

Referring to FIG. 3, in the embodiment, the comparison unit 140 performs comparisons through neighboring comparison signals to obtain each correct commutation signal. In detail, the negative input terminals of the first comparator 216, the second comparator 218, and the third comparator 220 are the same as the embodiment of FIG. 2, and are respectively coupled to the second terminals (node b1, node b2, and node b3) of the first switch 208, the second switch 210, and the third switch 212. The difference in the embodiment is that the positive input terminals of the first comparator 216, the second comparator 218, and the third comparator 220 are respectively coupled to the second terminals of the second switch 210, the third switch 212, and the first switch 208. Thus, the first comparator 216 compares the first comparison signal S_CU and the second comparison signal S_CV. The first correct commutation signal S_HU is outputted from the output terminal of the first comparator 216 according to the comparison result. Similarly, the second comparator 218 and the third comparator 220 respectively compare the second comparison signal S_CV and the third comparison signal S_CW, and the third comparison signal S_CW and the first comparison signal S_CU. The second correct commutation signal S_HV and the third correct commutation signal S_HW are respectively outputted at the output terminals of the second comparator 218 and the third comparator 220.

It should be noted that the first correct commutation signal S_HU, the second correct commutation signal S_HV, and the third correct commutation signal S_HW obtained in the embodiment are real commutation points, and do not require phase delay. Thus, the motor driving apparatus can generate corresponding driving signals directly according to the first correct commutation signal S_HU, the second correct commutation signal S_HV, and the third correct commutation signal S_HW.

In the aforementioned embodiment, the filter control signal S_ftr outputted by the control signal output unit 120 has a same switching cycle as a pulse width modulation control signal that drives the brushless motor. Thus, switching the on/off state of the switch unit 130 is performed according to the driving phase angle of the brushless motor 150 or the three phase brushless direct current motor 200. This method filters out the interference caused by the PWM control signal towards each correct commutation signal, and obtains the first correct commutation signal S_HU, the second correct commutation signal S_HV, and the third correct commutation signal S_HW with low noise. The first switch 208, the second switch 210, and the third switch 212 of the switch unit 130 (when the comparison unit 140 is a neutral comparison circuit, a fourth switch 214 is further included) can be achieved by analog switch integrated circuits, transistor switch circuits, or relays. The invention is not limited thereto.

Figure 4:
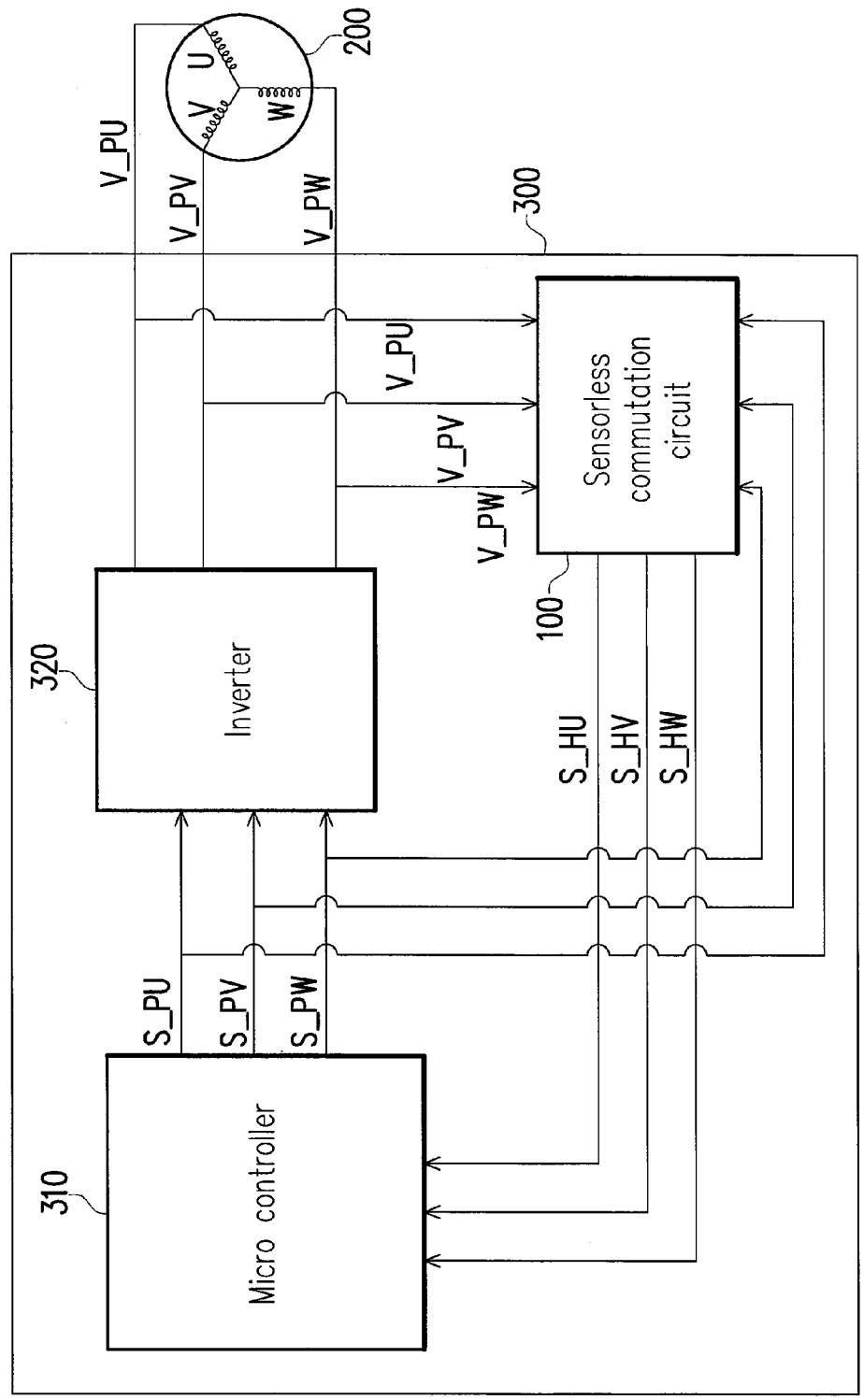
FIG. 4 is a schematic view illustrating a sensorless driving apparatus according to an embodiment of the invention.

FIG. 4 is a schematic view illustrating a sensorless driving apparatus according to an embodiment of the invention. Referring to FIG. 4, a sensorless driving apparatus 300 includes a micro controller 310, an inverter 320, and a sensorless commutation circuit 100. The sensorless driving apparatus 300 of the embodiment is suitable for the three phase brushless direct current motor 200 of the previous embodiment, but the invention is not limited thereto.

The sensorless commutation circuit 100 is coupled to the micro controller 310 and the inverter 320, and correspondingly outputs the first correct commutation signal S_HU, the second correct commutation signal S_HV, and the third correct commutation signal S_HW according to the three phase voltage signals (i.e. the first phase voltage signal V_PU, the second phase voltage signal V_PV, and the third phase voltage signal V_PW) of the three phase brushless direct current motor 200, and the operating method of the previous embodiment. Please refer to the previous embodiment for the detailed operating method of the sensorless commutation circuit 100, which will not be repeated herein.

The micro controller 310 correspondingly generates a first PWM control signal S_PU, a second PWM control signal S_PV, and a third PWM control signal S_PW according to the three correct commutation signals (i.e. the first correct commutation signal S_HU, the second correct commutation signal S_HV, and the third correct commutation signal S_HW) received by the sensorless commutation circuit 100. The inverter 320 is then coupled to the micro controller 310 to receive the three phase PWM control signals (i.e. the first PWM control signal S_PU, the second PWM control signal S_PV, and the third PWM control signal S_PW) of the three phase brushless direct current motor 200. The inverter converts the three PWM control signals to three phase voltage signals of the three phase brushless direct current motor 200, so as to control the rotation of the motor rotor (i.e. the first coil U, the second coil V, and the third coil W) of the three phase brushless direct current motor.

In detail, referring to FIG. 2, FIG. 3, and FIG. 4, at the initial startup condition of the three phase brushless direct current motor 200, the sensorless driving apparatus 300 performs an open loop control towards the three phase brushless direct current motor 200. That is to say, the micro controller 310 sends the three phase PWM control signals S_PU, S_PV, and S_PW to the three phase brushless direct current motor 200. After conversion by the inverter 320, the motor rotor is driven and the rotational speed is controlled directly according to the three phase voltage signals V_PU, V_PV, and V_PW. At this time, the sensorless commutation circuit 100 captures the three phase voltage signals V_PU, V_PV, and V_PW, and the three phase PWM control signals S_PU, S_PV, and S_PW. The sensorless commutation circuit 100 correspondingly generates the filter control signal S_ftr according to the three phase PWM control signals S_PU, S_PV, and S_PW, so that the sensorless commutation circuit 100 outputs three correct commutation signals S_HU, S_HV, and S_HW with low noise and feedbacks three correct commutation signals S_HU, S_HV, and S_HW to the micro controller 310. This allows the micro controller 310 to swiftly enter a closed loop control stage according to the three correct commutation signals S_HU, S_HV, and S_HW with low noise. As a result, the stability of the three phase brushless direct current motor 200 increases.

In addition, in some embodiments, the inverter 320 can be composed of three sets of half bridge rectifier circuits, and the micro controller 310 outputs six PWM control signals to control the phase voltage signals outputted by the three sets of half bridge circuits. However, the invention is not limited thereto.

To sum up, the sensorless commutation circuit of the brushless motor provided by the embodiment of the invention controls the on/off state of the switch unit according to the filter control signal that has a same switching cycle as a pulse width modulation control signal that drives the brushless motor. The sensorless commutation circuit outputs correct commutation signals with low noise according to different comparison units. In addition, when the brushless motor is in a low speed state of initial startup condition, the sensorless driving apparatus outputs stable PWM control signals according to the low noise correct commutation signals outputted by the sensorless commutation circuit. This way, the brushless motor swiftly enters a closed loop control state, so that increase the rotational speed of the brushless motor is raised in a short time and operates stably.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A sensorless commutation circuit for a brushless motor, comprising:
a voltage divided unit, outputting a voltage divided signal according to a phase voltage signal of the brushless motor;

a control signal output unit, outputting a filter control signal, wherein the filter control signal has a same switching cycle as a pulse width modulation control signal that drives the brushless motor;

a switch unit, coupled to the control signal output unit and the voltage divided unit, outputting a comparison signal according to the filter control signal and the voltage divided signal; and a comparison unit, coupled to the switch unit, and outputting a correct commutation signal according to the comparison signal, wherein the switch unit is switched in response to the filter control signal to output the voltage divided signal as the comparison signal.

2. The sensorless commutation circuit for the brushless motor as claimed in claim 1, wherein the brushless motor further includes a first coil, a second coil, and a third coil, respectively outputting a first phase voltage signal, a second phase voltage signal, and a third phase voltage signal.

3. The sensorless commutation circuit for the brushless motor as claimed in claim 2, wherein the voltage divided unit further includes a first voltage divider, a second voltage divider, and a third voltage divider, each with an input terminal and an output terminal;

the input terminals of the first voltage divider, the second voltage divider, and the third voltage divider are respectively coupled to the first coil, the second coil, and the third coil; and the output terminals of the first voltage divider, the second voltage divider, and the third voltage divider respectively output a first voltage divided signal, a second voltage divided signal, and a third voltage divided signal.

4. The sensorless commutation circuit for the brushless motor as claimed in claim 3, wherein the switch unit further includes a first switch, a second switch and a third switch each having a first terminal, a second terminal, and a third terminal;

the first terminals of the first switch, the second switch, and the third switch, are respectively coupled to the input terminal of the first voltage divider, the input terminal of the second voltage divider, and the input terminal of the third voltage divider;

the second terminals of the first switch, the second switch, and the third switch, respectively output a first comparison signal, a second comparison signal, and a third comparison signal; and the third terminals of the first switch, the second switch, and the third switch, are commonly coupled to the control signal output unit.

5. The sensorless commutation circuit for the brushless motor as claimed in claim 4, wherein the second terminals the first switch, the second switch, and the third switch are respectively coupled to a first capacitor, a second capacitor, and a third capacitor.

6. The sensorless commutation circuit for the brushless motor as claimed in claim 4, wherein the comparison unit further includes a first comparator, a second comparator, and a third comparator, each having a positive input terminal, a negative input terminal, and a signal output terminal;

the negative input terminals of the first comparator, the second comparator, and the third comparator are respectively coupled to the second terminals of the first switch, the second switch, and the third switch; and the signal output terminals the first comparator, the second comparator, and the third comparator respectively output a first correct commutation signal, a second correct commutation signal, and a third correct commutation signal.

7. The sensorless commutation circuit for the brushless motor as claimed in claim 6, wherein the switch unit further includes a fourth switch with a first terminal, a second terminal, and a third terminal;

the first terminal of the fourth switch is coupled to the output terminals of the first voltage divider, the second voltage divider, and the third voltage divider;

the second terminal of the fourth switch is coupled to the positive input terminals of the first comparator, the second comparator, and the third comparator, outputting a neutral signal; and the third terminal of the fourth switch is coupled to the control signal output unit.

8. The sensorless commutation circuit for the brushless motor as claimed in claim 7, wherein the neutral signal is generated according to the first voltage divided signal, the second voltage divided signal, and the third voltage divided signal.

9. The sensorless commutation circuit for the brushless motor as claimed in claim 6, wherein the positive input terminals of the first comparator, the second comparator, and the third comparator are respectively coupled to the second terminals of the second switch, the third switch, and the first switch.

10. A sensorless driving apparatus for a brushless motor, comprising:

a micro controller, outputting a pulse width modulation control signal according to a phase voltage signal;

an inverter, coupled to the micro controller, for switching the pulse width modulation control signal to a phase voltage signal of the brushless motor; and a sensorless commutation circuit, coupled to the micro controller and the inverter, the sensorless commutation circuit comprising:

a voltage divided unit, outputting a voltage divided signal according to the phase voltage signal of the brushless motor;

a control signal output unit, outputting a filter control signal, wherein the filter control signal has a same switching cycle as the pulse width modulation control signal;

a switch unit, coupled to the control signal output unit and the voltage divided unit, outputting a comparison signal according to the filter control signal and the voltage divided signal; and a comparison unit, coupled to the switch unit, and outputting the correct commutation signal according to the comparison signal, wherein the switch unit is switched in response to the filter control signal to output the voltage divided signal as the comparison signal.

* * * * *